United States Patent [19]

Khanshab et al.

[11] Patent Number: 5,830,266
[45] Date of Patent: Nov. 3, 1998

[54] SLOW BURNING ALCOHOL-FREE NITROCELLULOSE

[75] Inventors: Akber Ali Khanshab, Freehold; William R. Zacher, Middletown, both of N.J.

[73] Assignee: Aqualon Company, Wilmington, Del.

[21] Appl. No.: 811,336

[22] Filed: Dec. 20, 1991

[51] Int. Cl.$^6$ .................................................. C09D 101/18
[52] U.S. Cl. ............................... 106/169.15; 106/169.19; 106/169.24; 106/169.25; 106/169.27; 106/169.34; 106/169.39; 106/169.51
[58] Field of Search ........................... 106/173.1, 169.15, 106/169.19, 169.24, 169.25, 169.27, 169.34, 169.39, 169.51

[56] References Cited

U.S. PATENT DOCUMENTS

| | | | |
|---|---|---|---|
| 2,616,824 | 11/1952 | Meiler et al. | 106/173.1 |
| 3,325,315 | 6/1967 | Sapiego | 264/3 |
| 3,325,571 | 6/1967 | Sapiego | 264/3 |
| 3,325,572 | 6/1967 | Sapiego | 264/3 |
| 3,522,070 | 7/1970 | Webb | 106/173.1 |
| 3,615,792 | 10/1971 | Keene | 106/173.1 |
| 3,948,675 | 4/1976 | Rat et al. | 106/195 |
| 3,992,335 | 11/1976 | Denissenko | 106/173.1 |

*Primary Examiner*—David Brunsman
*Attorney, Agent, or Firm*—David Edwards

[57] ABSTRACT

An alcohol-free and encapsulated nitrocellulose which is primarily suitable for printing inks, varnishes and coatings consists of 65–75% nitrocellulose, 3–8% water, 10–15% non-solvating plasticizer and 10–15% of an active solvent suitable for both nitrocellulose and the plasticizer. A product is produced by drying water-wet nitrocellulose and spraying on a solution of plasticizer in solvent. Upon blending to a uniform consistency, the nitrocellulose becomes partially dissolved and encapsulated within the plasticizer/solvent mixture. The advantages of the invention are improved safety indicated by a lower rate of burning and reduced environmental pollution wherein the product is alcohol-free such that no additional alcohol recovery system is required.

12 Claims, No Drawings

SLOW BURNING ALCOHOL-FREE NITROCELLULOSE

FIELD OF THE INVENTION

The invention relates to a plasticized nitrocellulose suitable for printing inks, varnishes and coatings. In particular, the invention relates to an alcohol-free nitrocellulose plasticized with a non-solvating plasticizer.

BACKGROUND OF THE INVENTION

Nitrocellulose is generally wetted with alcohol to enable the product to be shipped safely prior to use in inks, varnishes or paints. When alcohol-wet nitrocellulose is used in the ink industry, an additional alcohol recovery step is necessary as the alcohol must be removed from the final formulation after the active solvent is removed. With progressively more restrictive environmental regulations going into effect throughout the country, the use of alcohol-wet nitrocellulose is becoming less economically feasible.

U.S. Pat. Nos. 3,325,315; 3,325,571 and 3,325,572 disclose how water-wet nitrocellulose can be treated with solvent and then a plasticizer such as triacetin. Products and processes were developed whereby phthalate plasticizers were added to nitrocellulose suspended in water to form plasticized nitrocellulose once the water was removed as described in Rat et al., U.S. Pat. No. 3,948,675, Apr. 6, 1976. This was initially felt to be safer than alcohol-wet nitrocellulose due to the relatively low flash point of volatile alcohols. However, in 1982 the Societe Nationale des Poudres et Expolsifs, France (the assignee of U.S. Pat. No. 3,948,675) published findings that phthalate plasticized nitrocelluloses are considerably more dangerous than alcohol-wet nitrocellulose. Tests revealed that the burn rate for plasticized nitrocellulose was considerably faster than for alcohol-wet nitrocellulose. Plasticized nitrocellulose of the prior art was also more sensitive to static electricity, and was prone to reignition (unlike alcohol-wet nitrocellulose).

Furthermore, phthalate plasticizers, such as dibutyl phthalate, present additional health and toxicity problems, especially when used in conjunction with ingredients which require FDA approval.

Other products and processes which include so-called "stabilized" nitrocellulose mixtures are known from Hoppe et al., DE 38 38 646 Al, May 17, 1990. The water soluble polyol (used instead of water, alcohol or plasticizer) is used as a curing agent to stabilize a polyurethane lacquer system, and is not used to stabilize the nitrocellulose itself.

The users of alcohol-wet or plasticized nitrocellulose recognized a need for a form of nitrocellulose which had improved safety (as indicated by a lower burn rate), reduced toxicity (i.e., no phthalate plasticizer) and which did not require an alcohol recovery system.

SUMMARY OF THE INVENTION

The invention provides an alcohol-free nitrocellulose product which is partially dissolved and encapsulated in a plasticizer/active solvent blend. The product offers significant advantages with regard to application in inks and varnishes and may be suitable for other applications as well.

On a weight basis, the product consists of 65–75% nitrocellulose, 2–10% water, 10–15% non-solvating plasticizer and 10–15% of an active solvent (preferably isopropyl acetate) which dissolves both nitrocellulose and the plasticizer. It is produced by drying water-wet nitrocellulose and spraying on a solution of plasticizer in solvent. Upon blending to a uniform consistency, the nitrocellulose becomes partially dissolved and encapsulated within the plasticizer/solvent mixture.

DETAILED DESCRIPTION OF THE INVENTION

An objective of this invention is to provide a new form of alcohol-free nitrocellulose by combining nitrocellulose with a non-solvating plasticizer and a primary solvent (suitable for both the plasticizer and nitrocellulose). The resulting product has superior properties in the form of an alcohol-free nitrocellulose.

The preferred non-solvating plasticizer is Hercolyn-D (R), a hydrogenated methyl ester of rosin with an acid number of 4–8 and a refractive index of 1.52 at±0.01 at 20° C. available from Hercules Incorporated. There are a variety of other suitable non-solvating plasticizers for the present invention including, but not limited to, fatty acid ester of pentaerythritol (Hercoflex® 600 plasticizer from Hercules), hydroabictyl alcohol (Abitol® plasticizer from Hercules), oil-modified sebacic acid alkyd (i.e., Paraplex RG-2), 2-butoxyethyl oleate (i.e., S-817), raw castor oil (i.e., Castor Oil AA), butyl acetyl ricinoleate (i.e., Baker's P-6, NL Industries), sebacic acid alkyd (i.e., Paraplex G-25), fractionated linseed oil (i.e., Selected No. 200 oil), and trioctyl phosphate.

Prior to being applied to the water-wet nitrocellulose, it is preferred that the non-solvating plasticizer be dissolved in a primary solvent suitable for both the plasticizer and nitrocellulose, for example, isopropyl acetate. The best results are achieved when equal parts by weight of plasticizer are added to the solvent. A range of roughly 10–15% by weight plasticizer and of roughly 10–15% active solvent is preferred. At these levels, the nitrocellulose is softened and partially dissolved, thereby facilitating encapsulation. If the weight of active solvent exceeds approximately 15% by weight, the nitrocellulose may dissolve, which is undesirable.

While the preferred solvent is isopropyl acetate, there are a variety of other suitable solvents which can be used alone or in combination. These solvents include the class of ethers, ketones, esters (i.e., isopropyl acetate), amides and nitroparaffins.

When the plasticizer/solvent mixture is combined with the nitrocellulose, the water content of the nitrocellulose is critical. Too much water in the nitrocellulose (above roughly 10%) results in diminished quality in the final ink or coating system. Too little water in the nitrocellulose (below roughly 2%) results in safety concerns with regard to the safe handling of the nitrocellulose. As a result, the moisture content of the nitrocellulose should be controlled to between approximately 2–10% by weight prior to applying the plasticizer/solvent mixture. The preferred embodiment of the invention is a moisture content of 4.5–5.5% in the nitrocellulose.

When the plasticizer/solvent mixture is applied to the nitrocellulose (or vice versa), the nitrocellulose essentially becomes encapsulated. Unlike the prior art (where the nitrocellulose is coated with plasticizer), this physical encapsulation preserves the integrity of the nitrocellulose. Encapsulation allows the nitrocellulose to go into the solution more readily in the ink, lacquer, or coating system because some solvent is already present. This is a significant advantage, especially for applications in the graphic arts industry in both pigmented ink formulations and clear overprint varnish systems.

The detailed steps of the process of the invention involve preparing a quantity of nitrocellulose dried to the preferred moisture level, and preparing the mixture of plasticizer in active solvent. The plasticizer/solvent mixture is then applied to the nitrocellulose, blended for uniformity and packaged.

Suitable grades of nitrocellulose include all industrial grades in the range of approximately 10.8–13.5% nitrogen. For example, RS, AS and SS grades of nitrocellulose, are available from Aqualon, a Hercules Incorporated Company.

The invention has industrial applicability for use in printing inks, lacquers and coatings. The following examples demonstrate the utility of the invention. All quantities are in terms of weight percent, unless otherwise indicated.

EXAMPLE 1

A 75 gram sample of water-wet nitrocellulose (grade: RS ⅛, 18–25 cps. viscosity) was dried from approximately 30% water down to 4.8% water. A 10.1 gram sample of Hercolyn-D (R) hydrogenated methyl ester of rosin plasticizer (available from Hercules Incorporated) was added to 10.1 grams of isopropyl acetate. The plasticizer solution was stirred until uniform, and then sprayed on the surface of the dried nitrocellulose using as it is being stirred to continually coat new surface area producing a nitrocellulose of uniform consistency encapsulated within the plasticizer solution.

A 35 gram sample of the alcohol-free encapsulated nitrocellulose was evaluated for safety via a burning rate test. Table I shows the results in comparison to alcohol-wet nitrocellulose and phthalate-plasticized nitrocellulose of the prior art.

TABLE I

| Sample | Burn Rate (sec.) |
| --- | --- |
| Alcohol-free Nitrocellulose | 25–26 |
| Alcohol-wet Nitrocellulose | 27–28 |
| Phthalate-plasticized nitrocellulose | 15–16 |

As can be seen from Table I, the burning characteristics of the alcohol-free nitrocellulose is equivalent to alcohol-wet nitrocellulose, and far superior to plasticized nitrocellulose of the prior art. As shown in Table I, the phthalate-plasticized nitrocellulose burns in about one half the time required for the alcohol-free nitrocellulose of the invention.

EXAMPLE 2

A sample of the alcohol-free nitrocellulose of Example 1 was incorporated in pigmented ink formulations using Calcium Lithol Red, Carbon Black, and MX Diarylide Yellow pigments. This was compared to an alcohol-wet nitrocellulose (with 15% Hercolyn-D (R) plasticizer added) used as a control sample. The alcohol-free nitrocellulose looked at least as good as the alcohol-wet nitrocellulose in pigmented ink systems. Comparative results are shown in Table II.

TABLE II

| Property | Alcohol-free Nitrocellulose | Alcohol-wet Nitrocellulose |
| --- | --- | --- |
| Solutions in Isopropyl Acetate | | |
| Viscosity, #2 Zahn, 25° C. | 25.8" | 21.0" |
| % Solids (NC & Hercolyn-D (R) (plasticizer) | 18.7 | 19.8 |
| Pigment Grind Properties - Calcium Lithol Red | | |
| NPIRI Grind Gauge Reading | 8/6 | 3/0 |
| Strength of Base vs. Control | equal | — |
| Consistency of Base Grind: | | |
| Comparative Viscosity vs. Control | slightly higher | — |
| Comparative Thixotropy | moderate | moderate |
| Pigment Grind Properties - Carbon Black | | |
| NPIRI Grind Gauge Reading | 0/0 | 0/0 |
| Strength of Base vs. Control | equal | — |
| Consistency of Base Grind: | | |
| Comparative Viscosity vs. Control | equal | — |
| Comparative Thixotropy | slight | moderate |
| Pigment Grind Properties - MX Diarylide Yellow | | |
| NPIRI Grind Gauge Reading | 6/4 | 4/0 |
| Strength of Base vs. Control | equal | — |
| Consistency of Base Grind: | | |
| Comparative Viscosity vs. Control | equal | foamy |
| Comparative Thixotropy | slight | moderate |
| Ink Properties - Calcium Lithol Red | | |
| Initial: | | |
| Viscosity, #2 Zahn, 25° C. (sec) | 19.1 | 18.6 |
| Gloss at 60 degrees | 46 | 41 |
| Aged at 100° F. for 1 week | 20 | 20 |
| Viscosity, #2 Zahn, 25° C. (sec) | | |
| % Change in Viscosity | +4.7 | +7.5 |
| Gloss at 60 degrees | 57.5 | 49 |
| Pigment settling | better | — |
| Ink Properties - Carbon Black | | |
| Viscosity, #2 Zahn, 25° C. (sec) | 26 | 23 |
| Gloss at 60 degrees | 57.5 | 49 |
| Pigment settling | better | — |
| Aged at 100° F. for 1 week | | |
| Viscosity, #2 Zahn, 25° C. (sec) | 25.3 | 21.4 |
| % Change in Viscosity | -2.7 | -7.0 |
| Gloss at 60 degrees | 51 | 4.5 |
| Pigment settling | none | none |
| Ink Properties - MX Diarylide Yellow | | |
| Viscosity, #2 Zahn, 25° C. (sec) | 20 | 19.5 |
| Gloss at 60 degrees | 41.3 | 45.5 |
| Other Observations vs. Control | cleaner | — |
| Aged at 100° F. for 1 week | | |
| Viscosity, #2 Zahn, 25° C. (sec) | 23.8 | 21.5 |
| % Change in Viscosity | +19 | +2.5 |
| Gloss at 60 degrees | 44 | 47 |
| Pigment settling | slight | trace |

EXAMPLE 3

A sample of the alcohol-free nitrocellulose prepared according to the method of Example 1 was incorporated in clear overprint varnishes. In this example, grade RS ½ sec. nitrocellulose was used. This was compared to an alcohol-wet RS ½ sec nitrocellulose (with 15% Hercolyn-D (R) plasticizer added), used as a control sample. The alcohol-free nitrocellulose was equivalent to the alcohol-wet nitrocellulose in clear overprint varnishes. The results can be seen in Table III.

TABLE III

| Property | Alcohol-free Nitrocellulose | Alcohol-wet Nitrocellulose |
|---|---|---|
| Solutions in Isopropyl Acetate | | |
| Gardner Bubble Viscosity, 25° C. | T-U | M |
| % Solids (NC & Hercolyn-D (R) plasticizer) | 18.7 | 19.8 |
| Overprint Varnish Properties | | |
| % Solids | 34.4 | 34.9 |
| Viscosity, #2 Zahn, 25° C. | 72 | 45.5 |
| % H$_2$O (Karl Fishcer) | 1.1 | 0.05 |
| % Isopropyl acetate for print viscosity | 25 | 23 |
| Viscosity, #2 Zahn, 25° (sec) | 22 | 21.4 |
| % Solids | 25.8 | 28.3 |
| % Nitrocellulose | 6.2 | 6.7 |
| Gloss at 60 degrees | 68 | 68 |

What is claimed is:

1. An alcohol-free nitrocellulose composition consisting essentially of on a weight basis 65–75% nitrocellulose, 2–10% water, 10–15% non-solvating plasticizer and 10–15% of an active solvent suitable for dissolving both nitrocellulose and the plasticizer where the alcohol-free nitrocellulose composition burns at a slower rate than nitrocellulose plasticized with phthalates.

2. The nitrocellulose of claim 1 where the solvent is one or more of the class of esters, ketones, amides and nitroparaffins.

3. The nitrocellulose of claim 2 where the solvent is isopropyl acetate.

4. The nitrocellulose of claim 3 where the non-solvating plasticizer is one or more of the group of fatty acid ester of pentaerythritol, hydrabietyl alcohol hydrogenated methyl ester of rosin, oil-modified sebacic acid alkyd, 2-butoxyethyloleate, raw castor oil, butyl acetyl ricinoleate, sebasic acid alkyd, fractionated linseed oil, and trioctyl phosphate.

5. The nitrocellulose of claim 3 where the non-solvating plasticizer is a hydrogenated methyl ester of rosin with an acid number of 4–8 and a refractive index 1.52 at 20° C.

6. The nitrocellulose of claim 5 comprising about 75% nitrocellulose, 5% water, 12.5% isopropyl acetate and 12.5% hydrogenated resin plasticizer.

7. A process for producing an alcohol-free nitrocellulose composition consisting essentially of the following steps:
(1) drying water wet nitrocellulose to a moisture content of 2–10% by weight;
(2) preparing a solution of a non-solvating plasticizer in an active solvent suitable for both nitrocellulose and the plasticizer;
(3) applying the plasticizer/solvent solution to the dried nitrocellulose; and
(4) mixing the plasticizer/solvent/nitrocellulose blend to a uniform consistency to prepare an encapsulated nitrocellulose which is alcohol-free.

8. The process of claim 7 where the solvent is one or more of the class of esters, ketones, amides and nitroparaffins.

9. The process of claim 8 where the solvent is isopropyl acetate.

10. The process of claim 9 where the non-solvating plasticizer is one or more of the group of fatty acid ester of pentaerythritol, hydroabietyl alcohol, hydrogenated methylester of rosin, oil-modified sebacic acid alkyd, 2-butoxyethyl oleate, raw castor oil, butyl acetyl ricinoleate, sebacic acid alkyd, fractionated linseed oil and trioctyl phosphate.

11. The process of claim 10 where the non-solvating plasticizer is a hydrogenated methyl ester of rosin with an acid number of 4–8 and a refractive index 1.52±0.01 at 20° C.

12. The process of claim 11 where the nitrocellulose is dried to 4.5–5.5% moisture by weight.

* * * * *